United States Patent
Secondi

(10) Patent No.: US 12,139,158 B2
(45) Date of Patent: Nov. 12, 2024

(54) ASSISTANCE METHOD TO IMPROVE THE PERFORMANCE OF A DRIVER BY EVALUATING HIS SKILLS AND FILTERING THE INFORMATION TO BE PROVIDED ON THE BASIS OF THE VALUE OBTAINED

(71) Applicant: FERRARI S.p.A., Modena (IT)

(72) Inventor: Andrea Secondi, Modena (IT)

(73) Assignee: FERRARI S.P.A., Modena (IT)

( * ) Notice: Subject to any disclaimer, the term of this patent is extended or adjusted under 35 U.S.C. 154(b) by 399 days.

(21) Appl. No.: 17/112,310

(22) Filed: Dec. 4, 2020

(65) Prior Publication Data
US 2021/0188302 A1    Jun. 24, 2021

(30) Foreign Application Priority Data

Dec. 6, 2019   (IT) .................... 102019000023244

(51) Int. Cl.
*B60W 50/14* (2020.01)
*B60W 30/095* (2012.01)
*B60W 40/09* (2012.01)
*G01C 21/34* (2006.01)

(52) U.S. Cl.
CPC ........ *B60W 50/14* (2013.01); *B60W 30/0956* (2013.01); *B60W 40/09* (2013.01); *G01C 21/3453* (2013.01); *B60W 2540/30* (2013.01)

(58) Field of Classification Search
None
See application file for complete search history.

(56) References Cited

U.S. PATENT DOCUMENTS

| 11,878,679 B2 * | 1/2024 | Secondi | B60W 30/045 |
| 11,945,458 B2 * | 4/2024 | Secondi | B60W 40/02 |
| 2005/0131597 A1 * | 6/2005 | Raz | G09B 19/167 |
| | | | 701/29.1 |
| 2010/0164703 A1 * | 7/2010 | Visconti | B60W 40/09 |
| | | | 340/438 |
| 2014/0188379 A1 * | 7/2014 | Gostoli | G07C 5/085 |
| | | | 701/123 |

(Continued)

FOREIGN PATENT DOCUMENTS

| DE | 102011121487 A1 | 6/2013 |
| DE | 102015203727 A1 * | 9/2016 |

(Continued)

OTHER PUBLICATIONS

Search Report issued in Italian Patent Application No. 201900023244 date of completion Sep. 3, 2020; 8 pages.

*Primary Examiner* — Peter D Nolan
*Assistant Examiner* — Jacob Kent Besteman-Street
(74) *Attorney, Agent, or Firm* — CANTOR COLBURN LLP

(57) ABSTRACT

A method for the performance-enhancing driver assistance of a road vehicle driven by a driver. The method comprises the steps of detecting a plurality of dynamic data (DD) of the vehicle by means of a control system, suggesting to the driver, by means of an interface device and depending on the plurality of dynamic data, one or more corrective actions to be carried out in order to accomplish a mission optimizing a cost function, and estimating the driving ability of the driver in order to obtain a driver rating value, based on which the corrective actions to be suggested are to be changed.

12 Claims, 6 Drawing Sheets

(56) References Cited

U.S. PATENT DOCUMENTS

| | | | |
|---|---|---|---|
| 2016/0362118 A1* | 12/2016 | Mollicone | G05D 1/0276 |
| 2018/0033327 A1* | 2/2018 | Nishijima | G09B 9/042 |
| 2021/0031803 A1* | 2/2021 | Cussigh | B60W 50/082 |
| 2021/0171018 A1* | 6/2021 | Secondi | B60W 10/20 |
| 2021/0188303 A1* | 6/2021 | Secondi | B60W 30/0956 |

FOREIGN PATENT DOCUMENTS

| | | | |
|---|---|---|---|
| EP | 1790946 A2 * | 5/2007 | B62D 15/029 |
| EP | 2199171 | 6/2010 | |
| EP | 2340976 A1 | 7/2011 | |
| EP | 2594447 A1 * | 5/2013 | B60W 40/09 |
| WO | 2019174932 A1 | 9/2019 | |

\* cited by examiner

ASSISTANCE METHOD TO IMPROVE THE PERFORMANCE OF A DRIVER BY EVALUATING HIS SKILLS AND FILTERING THE INFORMATION TO BE PROVIDED ON THE BASIS OF THE VALUE OBTAINED

CROSS-REFERENCE TO RELATED APPLICATIONS

This patent application claims priority from Italian patent application no. 102019000023244 filed on Dec. 6, 2019, the entire disclosure of which is incorporated herein by reference.

TECHNICAL FIELD

The invention relates to a method for the performance-enhancing driver assistance of a road vehicle and to a relative road vehicle.

PRIOR ART

Generally speaking, the performances of a vehicle (speed, rimes, consumptions, mileage, etc.) are not maximized because of different elements (limits set by the law, driver's ability, atmospheric conditions, . . . )

For example, speed limits on roads open to traffic are much lower than the actual performances offered by a car, especially in case of a high-performance sports car. As a consequence, when normally driving on a road, only a small part of the actual capacities of a high-performance sports car is used. For this reason, it frequently happens that the owner or a high-performance sports car occasionally decides to make some laps on a track, so as to try and fully enjoy the performances offered by the car. However, for an inexperienced driver, high-performance driving on a track can turn out to be very complicated, since it is completely different from everyday driving on roads open to traffic. In particular, an inexperienced driver can have a very hard time understanding the actual limits of the car and, as a consequence, there is, on the one hand, the chance that the performances of the car are not completely exploited and, on the other hand, there is the risk of going off the road, which is potentially dangerous both for the integrity of the car and for the safety of the driver.

Furthermore, an inexperienced driver might not be aware of the ideal trajectories to be followed in order to optimize track times.

On the other hand, the owner of a high-performance sports car, while driving on roads open to traffic, can try and maximize other types of performances, other than speed, such as for example the mileage and, hence, the reduction of consumptions.

In recent years, for driver assistance, many electronic assistance devices (for instance, anti-lock braking systems or ABS, traction control systems or ASR, stability control . . . ) were developed, which change the commands given by the driver depending on the actual limits of the car. However, the frequent intervention of said electronic driver assistance devices reduces the extent to which high-performance driving can be enjoyed and, therefore, their continuous interferences turn out to be fairly frustrating for a track driver. Hence, in some known cases, manufacturers introduced informative messages (for example, on when to shift gear or on the occurrence of given conditions), which are delivered by the vehicle to the driver through interfaces (for example, a led or a screen) so as to allow the driver to personally carry out the actions, thus increasing the driving pleasure.

However, according to prior art solutions, the vehicle delivers informative messages or signals and/or changes the commands given by the driver based on the sole state of the current dynamic of the vehicle (number or revolutions per minute, position of the pedals, open or closed hardtop, gear, steering wheel, etc.) or of the past dynamic thereof (acceleration/deceleration, previous gear, rotation speed of the steering wheel, etc.). In this way, the driver cannot be helped optimize a cost function (such as time or mileage) based on a mission that the vehicle still has to accomplish.

Furthermore, electronic driver assistance devices can do nothing when they are overruled by some physical limits of the car. For example, ABS prevents the wheels from blocking while braking, thus allowing for an efficient braking even when the brake pedal is pressed too violently, but of the braking is started too late, it cannot prevent the car from going off the road. These cases can cause danger and lack of safety for the drover and the car.

Document EP2199171 describes a method for the performance-enhancing driver assistance of a vehicle comprising the steps of: identifying a path; identifying an optimal point to operate an accelerator, brake, steering and/or gear-shift command; identifying the actual position of the vehicle; identifying the following optimal point; identifying a warning advance in compliance with an estimation of the driver's reaction time and in compliance with the actual speed and acceleration of the vehicle.

DESCRIPTION OF THE INVENTION

The object of the invention is to provide a method for the performance-enhancing driver assistance of a road vehicle as well as a road vehicle, which are at least partially free from the drawbacks described above and, at the same time, are simple and economic to be carried out and manufactured.

According to the invention, there are provided a method for the performance-enhancing driver assistance of a road vehicle and a road vehicle according to the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

PREFERRED EMBODIMENTS OF THE INVENTION

Figure 1:
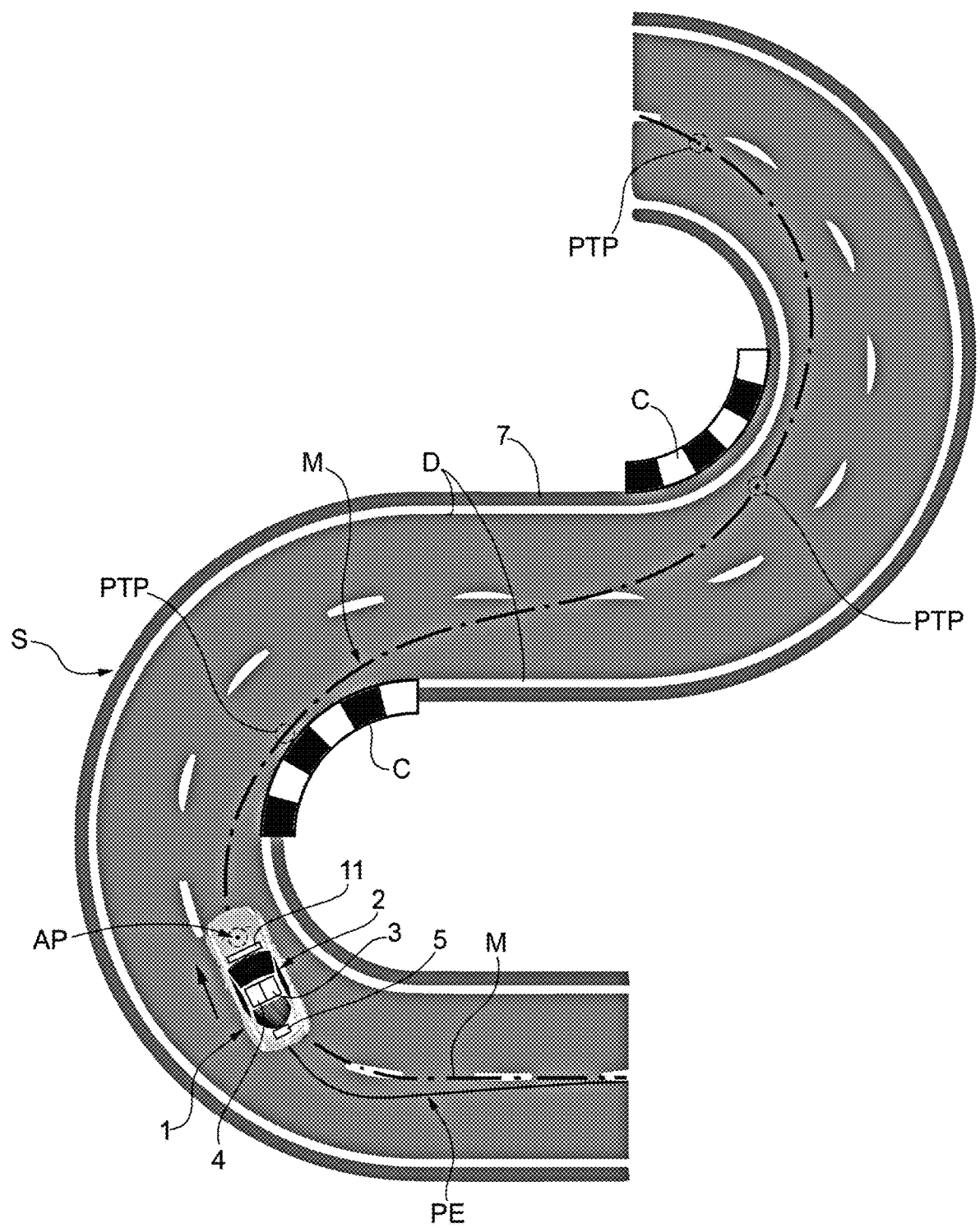
FIG. 1 is a schematic plan view of a road vehicle according to the invention driving along a stretch of road.

In FIG. 1, number 1 indicates, as a whole, a road vehicle driven by a driver DR (shown in FIG. 3) and provided with two front wheels and with two rear wheels (in particular, drive wheels).

The vehicle 1 is provided with a passenger compartment 2, which is designed to accommodate the driver DR and possible passengers.

The road vehicle 1 comprises a localization device 3, which is configured to identify an actual position AP and an actual orientation of the road vehicle. In particular, the localization device 3 can be any localization device using radio waves with a short range (e.g. ARVA® or RECCO®) with a long range (GPS). In some non-limiting cases, the localization device 3 comprises a device designed to detect the position AP of the road vehicle 1 and processes the orientation of the vehicle based on the direction in which it moves and on the position of the front wheels. In other non-limiting cases, the localization device 3 comprises both the device configured to detect the position AP of the road vehicle 1 and a device configured to detect the space orientation thereof (for example, an electronic three-axis compass).

According to some non-limiting embodiments, like the one shown in FIG. 1, the road vehicle 1 also comprises one or more ADAS (Advanced Driver-Assistance Systems) devices 4, which, in particular, comprise a plurality of sensors of different types (cameras, ultrasound, laser, radar, light, humidity, temperature, etc.) and are configured to detect a plurality of (space-related and non-space-related) environmental data ED concerning the environment where the road vehicle 1 operates.

For example, the environmental data ED comprise, among other things: the development and the delimitations of a stretch 7 of road S (or track 8) on which the vehicle 1 is standing; the presence of obstacles (such as, for example, other vehicles, pedestrians, debris) or curbs C; the temperature on the outside of the vehicle 1; air humidity; wind; the features of the road surface; the light; etc.

Advantageously, though not necessarily, the plurality of environmental data comprise the height and the position of (fixed and movable) obstacles and/or the position (as well as derivatives thereof, such as speed and acceleration) of cars to be surpassed.

Advantageously, the road vehicle 1 comprises a control system 5, which is configured to detect a plurality of dynamic data DD of the vehicle 1. The control system 5 comprises a plurality of sensors, for instance accelerometers, torque sensors, position sensors, . . . . More precisely, the dynamic data DD of the vehicle are, for example: speed and acceleration of the vehicle (both in a longitudinal and in a transverse direction); emitted torque, gear, number or revolutions per minute of the engine and derivatives thereof; position of the pedals (brake, accelerator and possibly clutch), driving mode (racing, city, sports, eco); open/closed hardtop; position of the steering wheel SW, etc.

Figure 2:
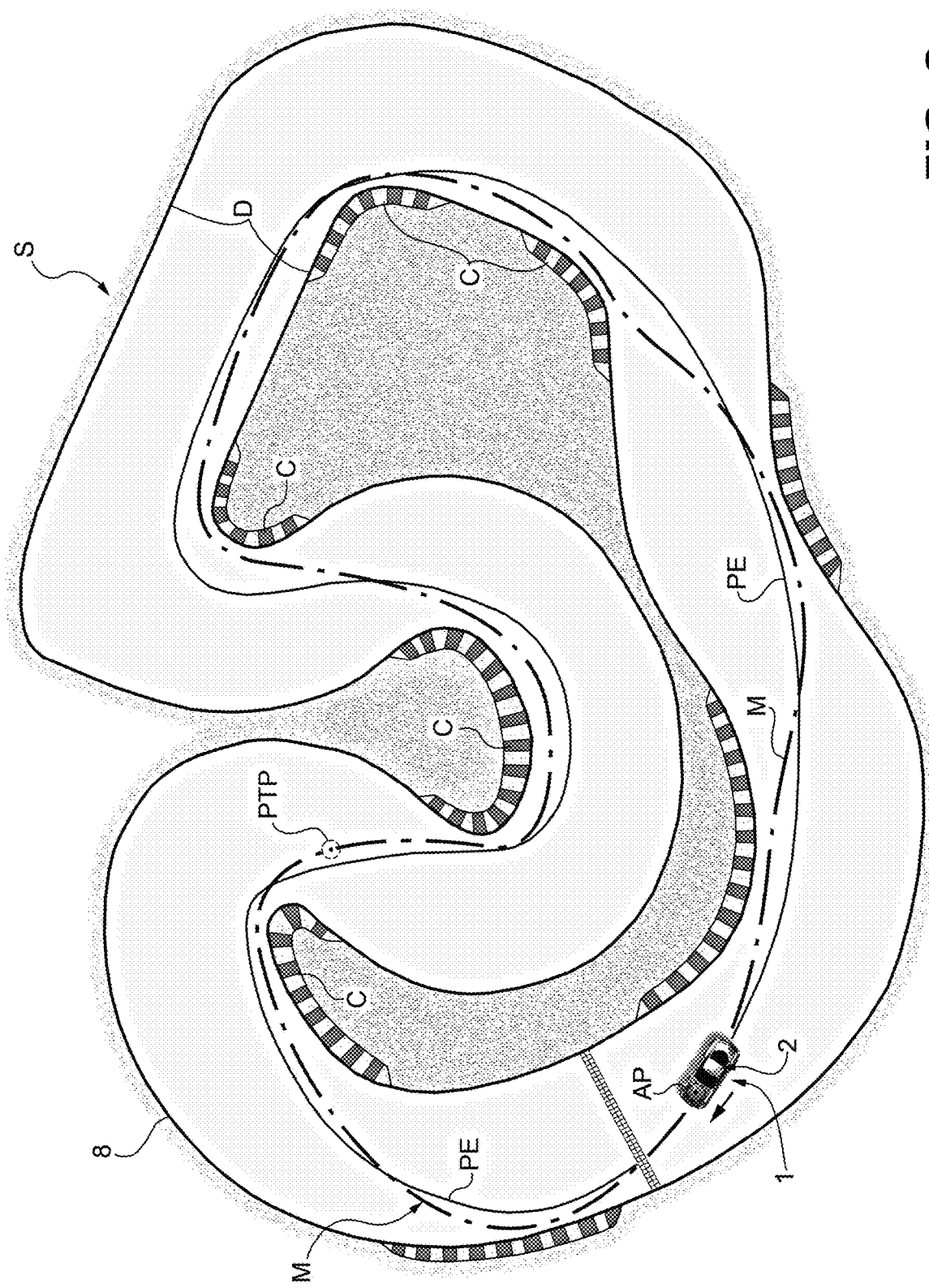
FIG. 2 is a schematic view of a road vehicle according to the invention driving on a track.
Figure 3:
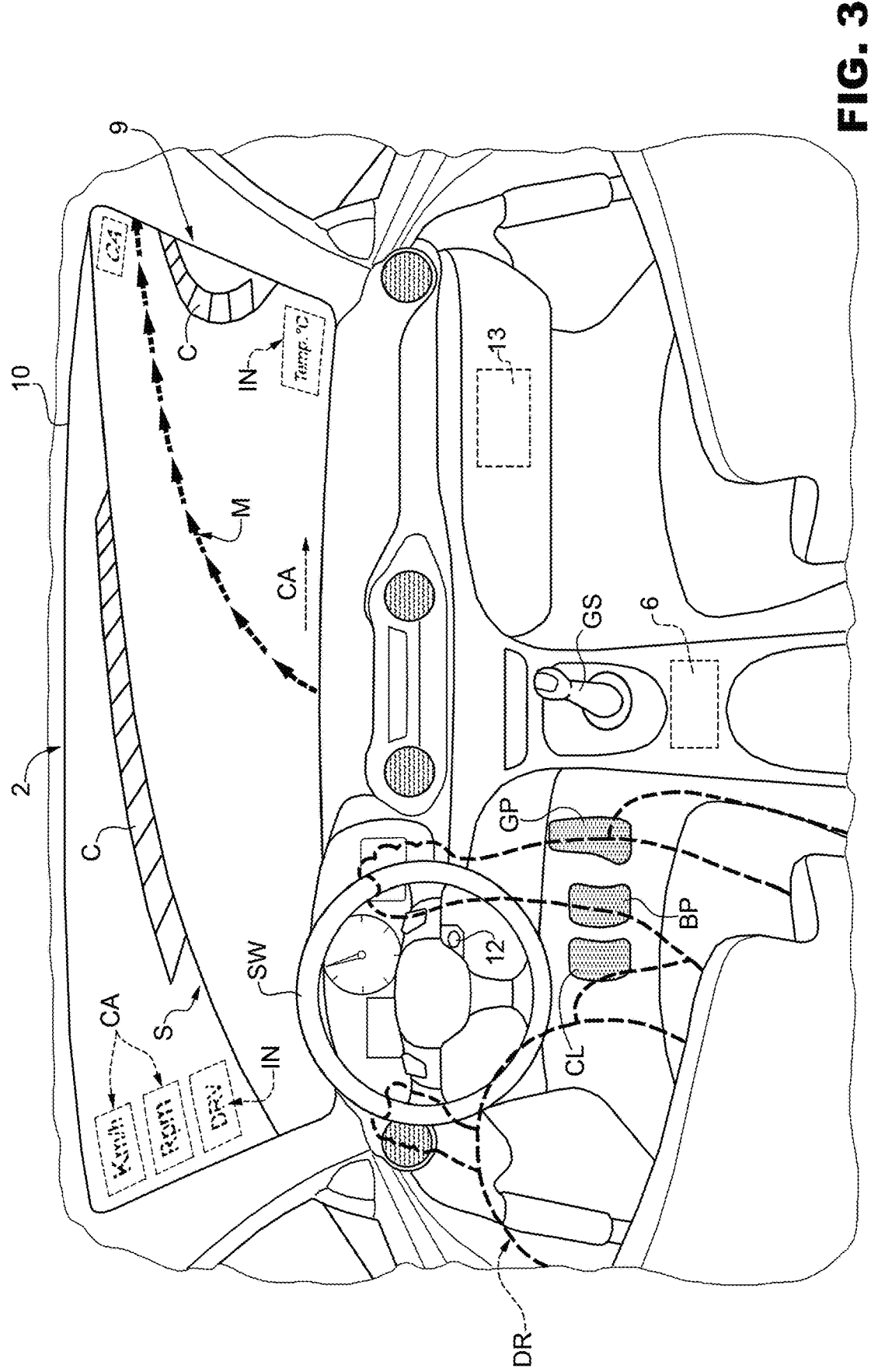
FIG. 3 is a schematic perspective view of the view from the inside of the passenger compartment of the vehicle of FIG. 1.

Advantageously, according to the non-limiting embodiment of FIG. 3, the vehicle comprises a calculation unit 6 (arranged on the inside or on the outside on board the vehicle 1), which is configured to solve, through the use of a dynamic model DM of the road vehicle 1 (FIGS. 4 and 5), an optimum control problem OCP aimed at optimizing a cost function CF, taking into account, as boundary conditions, the plurality of environmental data ED, the actual position AP and a passing through point PTP of the vehicle 1, and to process the mission M optimizing the cost function CF from the actual position AP of the vehicle to the passing through point PTP of the vehicle 1 (shown in FIGS. 1 and 2.

According to some non-limiting embodiments, the passing through point PTP is at a distance from the road vehicle 1 ranging from 5 to 500 metres. In particular, the distance between the passing through point PTP and the vehicle 1 is smaller than 200 m. In this way, by decreasing the distance between the actual position AP and the passing through point PTP, the accuracy of the mission M to be accomplished increases.

However, an excess reduction thereof would lead to an increase in the computing effort to be made by the calculation unit 6 in order to solve a large number of optimum control problems OCP in a small time (each problem needs to be solved before another one arises in order to drive the vehicle 1 towards a new passing through point PTP).

In the non-limiting embodiment of FIG. 1, the vehicle 1 is shown while driving along a stretch 7 of rad S (for example, a one-way mountain road). On the other hand, in the non-limiting embodiment of FIG. 2, the vehicle 1 is shown while driving on a track 8.

In particular, in the non-limiting embodiments of FIGS. 1 and 2, the cost function CT to be optimized is time. Therefore, the mission M defines a trajectory and a plurality of time-related driving commands (accelerations, decelerations, gear shifts, etc.) calculated by the calculation unit 6 in order to minimize the time needed to drive from the actual position AP to the passing through point PTP. In particular, the passing through points PTP are always located along the trajectory defined by the mission M.

In other non-limiting embodiments which are not shown herein, the cost function CF to be optimized is different from time. For example, in a road open to traffic (such as the mountain road of FIG. 1), the cost function CF could be the fuel consumption (to be minimized) and, hence, the mileage (to be maximized). In this case, the mission M is a trajectory calculated by the calculation unit 6 in order to minimize the fuel consumption, in particular also taking into account, in the calculation, the dynamic data DD and the environmental data ED of the vehicle 1. For example, the calculation unit 6 processes the mission M (hence, the trajectory) tanking into account the gradient of the path (steep uphill slopes determine a larger consumption of fuel), the time needed to cover the stretch of road, etc.

In some non-limiting cases, like the one shown in FIG. 3, the vehicle 1 comprises an interface device 9, which is configured to suggest to the driver DR, depending on the plurality of dynamic data DD, one or more corrective actions CA to be carried out in order to accomplish the mission M optimizing the cost function CF.

In the non-limiting embodiment of FIG. 3, the interface device 9 is an augmented reality interface device. In particular, said interface device 9 is located in the area of the windshield 10. More precisely, the windshield 10 is the interface device 9, since it is configured to display, for the driver DR, the mission M as well as information IN concerning the driving state and the corrective actions CA to be carried out in order to accomplish the mission M. In other words, according to the non-limiting embodiment of FIG. 3, the windshield 9 is configured to project suggestions advising the driver DR on how to improve his/her performance PE in order to accomplish the mission M.

According to a further non-limiting embodiment, which is not shown herein, the interface device 9 is a head-up display (HUD).

In other non-limiting embodiments, which are not shown herein, the interface device 9 comprises communication means other than video, such as, for example, audio signals in the loudspeakers of the vehicle 1, vibrations of a steering wheel SW and/or seat and/or other parts in contact with the driver DR, led lightening, wording on the dashboard, etc.

According to some non-limiting embodiments, the vehicle 1 further comprises a plurality of actuator devices (which are known and not shown herein). In particular, the actuator devices are configured to actively help the driver DR by correcting the position of the steering wheel SW and/or the use of a gas pedal GP, brake pedal BP, clutch pedal CL (if present) or of a paddle (for example, in case of an automatic/robotic transmission) for a gear change, so as to prevent the performance PE from straying from the mission M beyond a predefined value. In other words, in this way, the vehicle 1 allows the driver to obtain a good performance PE in a semi-automatic manner, autonomously helping the driver DR (approximately) accomplish the mission M.

Alternatively or in addition, the actuator devices are configured to restore a lost safety condition. In other words, in case the driver DR makes actions that are dangerous form himself/herself and/or for the vehicle 1, the actuator devices are configured to correct the position of the steering wheel SW and/or of a pedal GP, BP, CL and/or a gear (in particular, by means of an automatic/robotic transmission), so as to restore the safety condition. For instance, if, by means of the dynamic data DD and/or the environmental data ED, the vehicle 1 detects a danger situation (too high a speed relative to an obstacle that is too close, too much oversteering or understeering, excess wear of the tyres, . . . ), the actuator devices change the position of a brake pedal BP and/or of a gas pedal GP and/or shift gear so as to restore the safety both of the vehicle 1 and of the driver DR, for example by braking and/or steering and/or shifting gear, etc.

Obviously, this also includes the case in which the pedals GP, BP, CL, the transmission and/or the steering wheel are not directly connected to the last output (to the gas, to the brakes, to the clutch, to the gears of the transmission and to the wheels) for which said actuator devices are operated. In this case, the actuator devices change the position of the last output without necessarily changing the one of the pedals, of the steering wheel or of the gear stick, etc.

In FIG. 1, the performance PE is indicated with a solid line and indicates the segment of mission M already covered by the vehicle 1, whereas the mission M is indicated with a broken line and indicates, in a general manner, the ideal mission M to optimize the function CF in that stretch 6 of road from the actual position AP to the passing through point PTP.

According to some non-limiting embodiments, the vehicle 1 comprises a control unit 11, which, in particular, is connected to the actuator devices and is configured to control (more precisely, drive) the vehicle 1 in an autonomous manner so as to show the driver DR the mission M optimizing the cost function CF. In particular, the actuator devices are configured to autonomously move the steering wheel SW and/or a brake pedal BP and/or a gas pedal and/or to shift gear (in particular, by means of an automatic/robotic transmission). In this way, the vehicle 1 empirically shows the driver DR how to cover the stretch 7 of road extending from the actual position AP of the vehicle to the passing through point PTP.

In the non-limiting embodiment of FIG. 3, the vehicle comprises, in particular close to the steering wheel SW, a device 12 to operate the control of the vehicle 1 by the control unit 11. In particular, the operating device 12 is a button or a lever, which is configured to activate or deactivate the autonomous control of the vehicle 1 by the control unit 11. In other words, by activating the operating device 12, the driver DR decides when to have the vehicle 1 show him/her the mission M to be accomplished, so that he/she can replicate it, for example, during the next lap of the track 8 shown in FIG. 2. For example, in case the driver has to drive along a difficult stretch of road and cannot carry out the corrective actions suggested by the interface device 9, he/she can press the operating device 12 close to the difficult stretch of road so that the control unit 11 shows him/her, taking over control of the vehicle, how to correctly accomplish the mission M also covering the difficult stretch of road.

Advantageously, though not necessarily, the vehicle 1 also comprises an estimation unit 13 (schematically shown in FIG. 3), which is configured to estimate the driving ability of the driver DR and to obtain a driver rating value DRV, based on which to change the corrective actions CA to be suggested to the driver DR. In particular, the estimation unit 13 is configured to record and process the dynamic data DD of the vehicle 1 so as to calculate the driver rating value DRV.

After having obtained the value DRV, the estimation unit 13 is configured to classify the driver DR so that the interface device 9 can provide him/her with a quantity of information IN appropriate for his/her driving ability.

According to a further aspect of the invention, there is provided a method for the performance-enhancing driver assistance of the road vehicle 1, in particular driven by the driver DR.

According to a non-limiting embodiment, the method comprises the step of defining, only once during a design and development phase, a dynamic model DM of the road vehicle 1. The expression "only once" means "only one time". In particular, we hereby mean "any time the number of variables of the dynamic model DM is changed" (for example, through the addition or the removal of an actuator or of a sensor).

Advantageously, though not necessarily, the method comprises the further step of determining, in use, the actual position AP and orientation of the road vehicle 1 in the space by means of the localization device 2.

In the non-limiting case in which the road vehicle 1 drives along a track 8, according to FIG. 2, the method comprises the step of detecting a plurality of space data concerning the structure of the track (for example, distances, gradients, radius of curvature, etc.). These data can be detected through upload from a database containing the data of the different tracks and by means of sensors mounted on board the vehicle 1.

Figure 4:
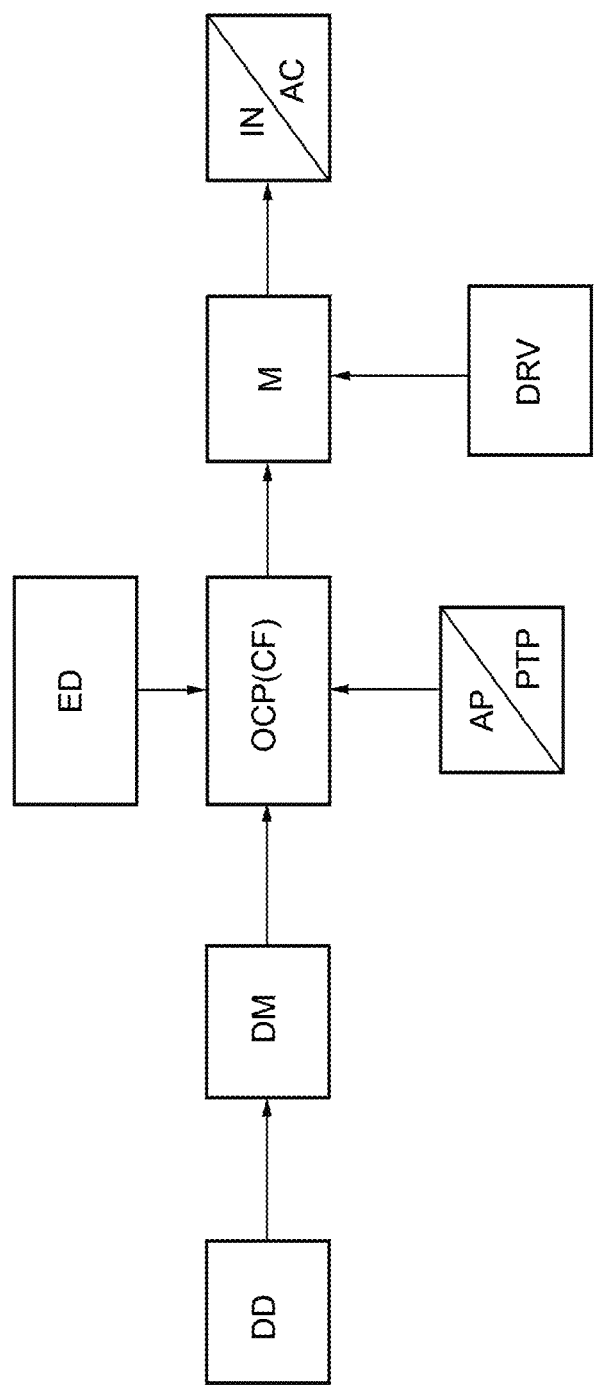
FIG. 4 is a schematic diagram showing a first embodiment of the method according to the invention.
Figure 5:
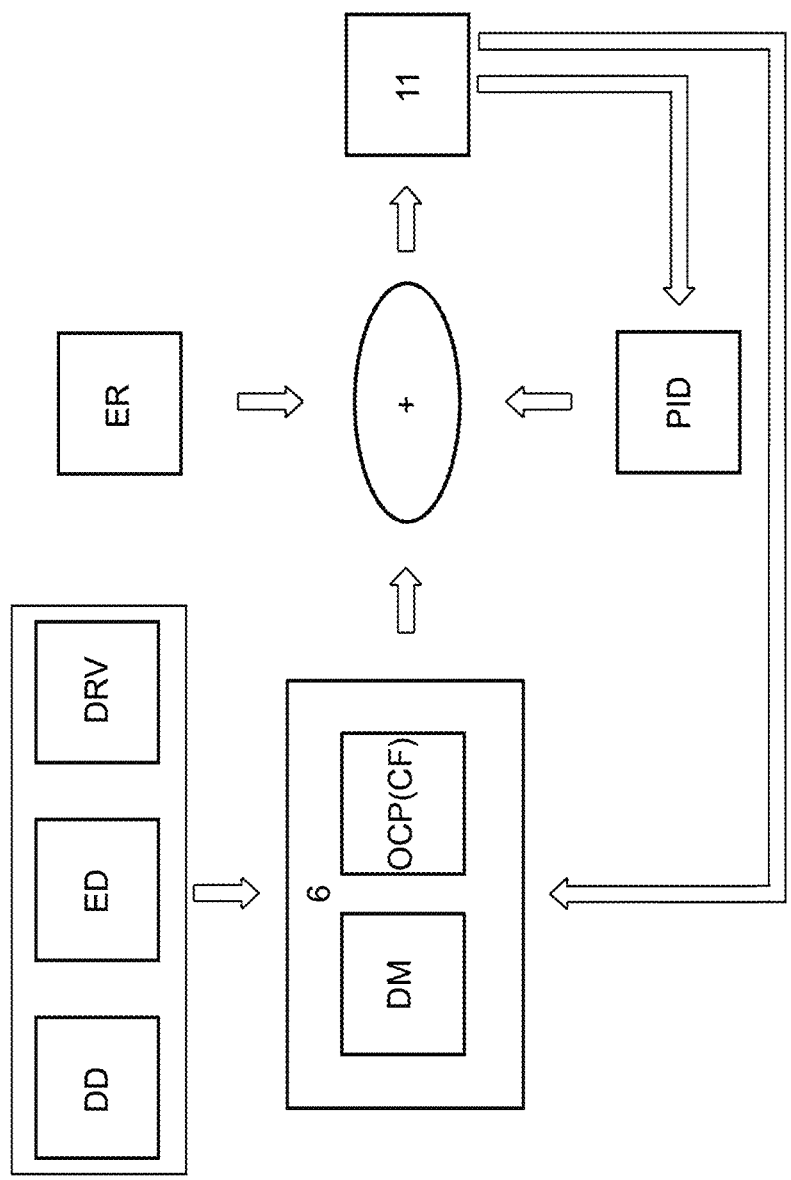
FIG. 5 is a schematic diagram showing a second embodiment of the method according to the invention.

According to the non-limiting embodiments of FIGS. 4 and 5, the method comprises the steps of detecting, in use, the plurality of environmental data ED concerning the environment in which the road vehicle 1 operates by means of the ADAS devices 4, and of detecting, in use, the plurality of dynamic data DD of the vehicle 1 described above by means of the control system 5. In this way, the vehicle 1 is aware, instant by instant, of the environment surrounding it and of how it is moving within said environment. In particular, the vehicle is aware of the stretch of road S ahead of itself.

Advantageously, though not necessarily, the environmental data ED also comprise the position and/or the height of the curbs on the track or the humidity of the air (on the outside of the vehicle) and/or the features of the road surface (namely, of the asphalt) as well as the temperature thereof or the position of cars to be surpassed.

According to some non-limiting embodiment, the method comprises the further step of determining, in use, in an automatic manner completely independent of the driver (DR) and cyclically, (at least) a passing through point PTP of the road vehicle 1 arranged in front of the road vehicle 1 and at a given distance from the road vehicle 1, in particular along a path (for example the stretch of road 7 or the track 8) followed by the road vehicle 1.

Advantageously, though not necessarily, the passing through point PTP is calculated in such a way that the distance between the actual position AP and the passing through point PTP is variable. In particular, the distance between the actual position AP and the passing through point PTP is smaller in bends (the sharper the bend, the smaller the distance) and greater in straight segments (the longer the straight segment, the greater the distance).

In particular, the method comprises the step of solving, in use and through the use of the dynamic model DM of the road vehicle 1, an optimum control problem OCP aimed at optimizing the cost function CF, taking into account, as boundary conditions, the plurality of environmental data ED, the actual position AP and the passing through point PTP, so as to compute the mission M optimizing the cost function CF from the actual position AP of the vehicle 1 to the passing through point PTP of the vehicle 1.

More precisely, by "optimum control problem" we mean a problem of optimization of the cost function CF constrained by differential algebraic constraints. In this specific case, the cost function CF is constrained by the dynamic of the vehicle 1 (data DD), by the environment in which the vehicle 1 is moving (data ED), by the initial position of the vehicle 1 (actual position AP) and by the final position of the vehicle 1 (passing through point PTP). According to a non-limiting embodiment, the form of the optimum control problem OCP is described by the following formula:

$$J[u]=M(x(T))+\int_0^T l(x(t), u(t), t)dt$$

subjected to the following constraints:

$$\dot{x}(t)=f((x(t), u(t), t)$$

$$b(x(0), x(T))=0$$

$$c(x(t), u(t), t) \geq 0$$

wherein x(t) and u(t) represent the states and the controls of the dynamic system, respectively, b(x(0), x(T)) represents the vector of the constraint (actual position AP and final position PTP) and the vector c(x(t),u(t),t) represents the limitations of the stretch 7 of road or of the track 8. The function J[u] is the cost function and evaluates a scalar (such as, for example, time or fuel consumption).

M(x(T)) represents the Mayer problem or final cost, whereas l(x(t), u(t),t) is the Lagrange problem or running cost. By minimizing the function J[u], namely the cost function CF, the optimum control problem OCP is solved, thus obtaining, as a result, a mission M minimizing the cost function CF.

Advantageously, though not necessarily, the mission M determines, in use, an optimal trajectory depending on the actual position AP of the vehicle, on the passing through point PTP, on the environmental data ED and on the dynamic data DD of the vehicle 1.

In other words, when covering the optimal trajectory, the road vehicle 1 moves from the actual position A to the passing through point PTP optimizing the cost function CF (hence, accomplishing the mission M). In particular, together with the trajectory, the mission M also defines a plurality of driving parameters, such as, for example, the speed in each point of the trajectory, the most convenient gear, the acceleration, the position of the steering wheel SW, etc.

Advantageously, though not necessarily, the mission M is cyclically updated based on the passing through points PTP defined along it and on the actual position of the vehicle.

According to some non-limiting embodiments, like the one shown in FIG. 3, the method comprises the further step of suggesting to the driver DR, by means of the interface device 8 (for example, the windshield 10) and depending on the plurality of dynamic data DD, one or more corrective actions CA to be carried out in order to accomplish the mission M optimizing the cost function CF. In particular, the corrective actions CA are suggested to the driver DR by means of the interface device 9 in augmented reality. According to the non-limiting embodiment shown in FIG. 3, the interface device 9 shows, besides the corrective actions to be carried out (such as, for example, an instruction to downshift because the vehicle is getting close to a bend or arrows indicating on which side to turn in order to get closer to the mission M or the number of revolutions per minute and the speed to be reached when approaching a bend), also shows items of information IN, such as, for example, the rating value DRV reached by the driver during the previous lap, the external temperature or the temperature of the brakes, etc.

In the non-limiting embodiment of FIG. 3, the driver DR also sees the trajectory defined by the mission M.

Is some non-limiting cases, the interface device 9 transmits the corrective actions CA to the driver DR by means of an at least partially transparent screen arranged in the area of a windshield 10 of the road vehicle. In the non-limiting embodiment of FIG. 3, the interface device is the entire windshield 10. In other non-limiting embodiments, which are not shown herein, the interface device 9 comprises other types of interface, as already mentioned above.

According to some non-limiting embodiments, the method comprises the further steps of estimating the driving ability of the driver DR and of obtaining a driver rating value DRV so as to point out possible errors made during the replication.

Advantageously, though not necessarily, the driver rating value DRV is used to change (both in terms of number and in terms of content) the corrective actions AC to be suggested. In this way, experienced drivers can be provided with more accurate suggestions (for example, increasing or decreasing the temperature of the tyres) compared to less experienced drivers (who would not be capable of fully understanding said more accurate suggestions). In particular, the step of estimating the driving ability of the driver DR is carried out by the estimation unit 13, which, in use, estimates the driving ability and processes a driver rating value DRV, based on which the corrective actions CA to be suggested are changed (together with the information IN). According to some non-limiting embodiments, during this step, the estimation unit 13 records and processes the dynamic data DD (and, if necessary, also how close the performance PE is to the mission M) of the vehicle 1 so as to calculate the driver rating value DRV. After having obtained the value DRV, the estimation unit 13 classifies the driver DR so that the interface device 9 can provide him/her with a quantity of information IN and corrective actions CA to be operated that is deemed to be appropriate for his/her driving ability.

Advantageously, though not necessarily, the driving ability of the driver DR is estimated by comparing ideal behaviours (which are predefined based on theoretical bases or on empirical bases of actions carried out by an experienced driver on a track), with a plurality of driving evaluations 14, in particular the use of the brake pedal BP and/or the use of a transmission, if present (through the use, for example, or a gear stick GS or of shifting paddles on the steering wheel) and/or the use of a steering wheel SW and/or the use of a gas pedal GP and/or the wear of one or more tyres and/or the use of oversteering and understeering and/or the trajectory (namely, the performance PE) followed (relative to the mission M). In particular, following the estimation of the driving ability, a result is communicated to the driver DR, said result classifying the estimated driving ability (the result can directly be the value DRV or be obtained from it).

Figure 6:
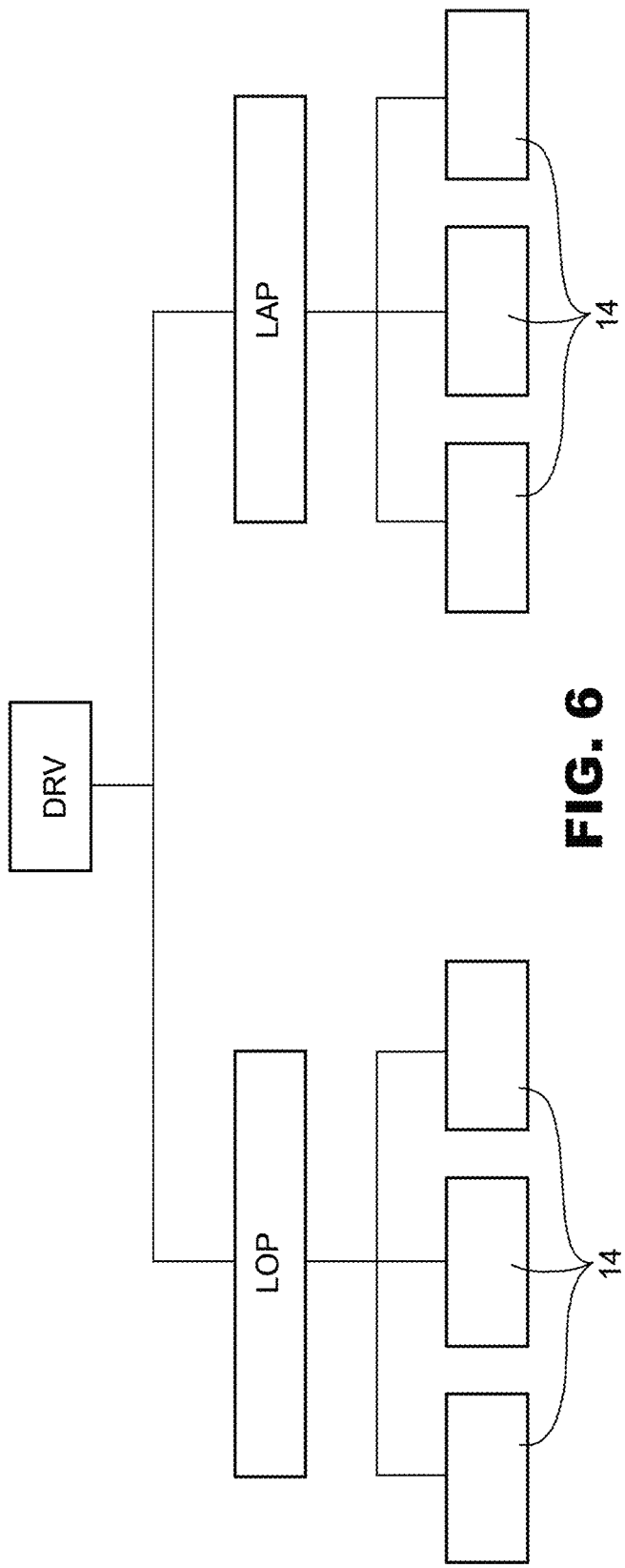
FIG. 6 is a schematic tree diagram to evaluate the driving ability of a driver.

In the non-limiting embodiment shown in FIG. 6, the value DRV is a (numerical) multifactorial value. More precisely, the value DRV rating the driving ability of the DR takes into account a plurality of estimations of the longitudinal performances LOP of the vehicle 1 and of the lateral performances LAP of the vehicle 1. The longitudinal performances LOP are obtained, in turn, taking into consideration a plurality of driving evaluations 14, for example: the use of the brake pedal BP (the evaluation is high if the driver DR makes high decelerations during the braking); the use of a possible transmission (the evaluation is high if the engaged gear and the gear shifting point allow the performance PE to be close to the mission M of the vehicle 1); the use of the gas pedal GP (the evaluation is high if the maximum level of acceleration of the vehicle 1 for each gear is reached, in particular according to the grip of the tyre). The lateral performances LAP are also obtained taking into consideration a plurality of independent driving evaluations 14, for example: the use of the steering wheel SW (the evaluation is high if the action exerted upon the steering wheel SW has a standard deviation around the mean value of the mission M); the direction of the vehicle 1 (the evaluation is high if the driver is capable of following the mission M and this evaluation is carried out by comparing the yaw of the vehicle with a reference value); the use of oversteering and understeering (the evaluation is high if the dynamic behaviour of the vehicle along a bend is neutral, namely without oversteering or understeering); the wear of the tyres (the evaluation is high if the driver DR manages to simultaneously make use of the longitudinal and lateral features of the tyre).

Advantageously, though not necessarily, the driving ability and, hence, the value DRV are evaluated also taking into account the difficulties of the mission M optimizing the cost function CF. In particular, each driving evaluation takes into account the degree of difficulty of the mission M.

Advantageously, though not necessarily, in order to allow for a more in-depth evaluation and for an accurate calculation of the value DRV, each driving evaluation has a respective weight and the driver rating value DRV is calculated by means of a weighted mean of the driving evaluations 14.

Advantageously, though not necessarily, part of the driving evaluations 14 have a static weight SW and part of the driving evaluations 14 have a dynamic weight depending on the difficulty of the mission M optimizing the cost function CF.

The following formula shows a non-limiting way to calculate the value DRV rating the driving ability of the driver DR.

$$DRV = \frac{\sum (V * W * DW)}{\sum (W * DW)}$$

"V" indicates the value (in particular, as a percentage relative to a reference value) of a specific driving evaluation 14. "W" indicates the static value (in particular, as a percentage relative to the total weight) of each driving evaluation 14 and remains constant as the mission M changes. "DW" indicates the dynamic weight (in particular, as a percentage relative to the total weight) associated with a specific driving evaluation 14.

The dynamic weight varies as the mission changes and indicates the effect of the type of mission M (in particular, the difficulty thereof) on the calculation of each driving evaluation 14. For example, the dynamic weight is evaluated based (within the mission M) on the average speed of the vehicle 1, the gradient of the road S, the type of path (urban, suburban, motorway, track), the weather, the features of the road surface, . . .

Obviously, the weight (both the static and the dynamic weight) of the single driving evaluations 14 changes depending on the type of transmission present in the vehicle 1, namely on whether it is an automatic or manual transmission.

For example, in case of an automatic transmission, the use of the transmission has a zero weight, since it does not depend on the driver DR, whereas the use of the gas pedal GP or of the brake pedal BP has a greater weight.

Figure 7:
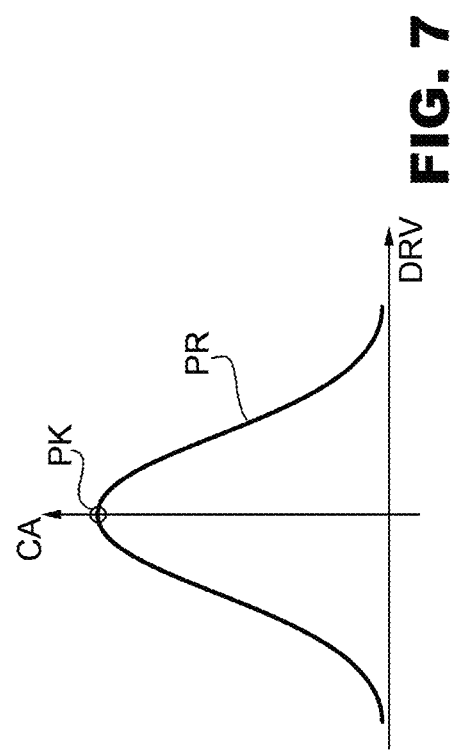
FIG. 7 is a bell diagram to establish how many items of information have to be transmitted to the driver.

Advantageously, though not necessarily, according to the diagram of FIG. 7, the quantity of corrective actions CA suggested to the driver DR follows a variable profile PR which changes depending on the driver rating value DRV. In particular, in FIG. 7, the abscissa indicates the driver rating value DRV, whereas the ordinate indicates the quantity of corrective actions CA and, hence, information IN to be suggested to the driver DR.

According to the non-limiting embodiment of FIG. 7, the variable profile PR is a symmetrical profile, which comprises, in particular, a central peak PK.

More precisely, the variable profile PR is a bell-shaped profile. In this way, a few and simple corrective actions CA (and items of information IN) are suggested to an inexperienced driver, a medium-level driver, who has a greater understanding than an inexperienced driver, is provided with a large quantity of information IN and corrective actions CA so as to allow him/her to quickly improve, whereas an experienced driver receives, again, a few items of information CA as well as suggestions on a few corrective actions CA, as a larger number of suggestions would be unnecessary.

According to some non-limiting embodiments which are not shown herein, the variable profile PR comprises a plurality of peaks PK.

According to other non-limiting embodiments which are not shown herein, the variable profile PR is asymmetrical.

The non-limiting embodiment of FIG. 4 shows a schematic diagram in which the vehicle 1 collects the dynamic data DD (by means of the control system 5) and delivers them to the dynamic model DM, which, in turn, together with the environmental data ED and with the boundary conditions, such as actual position AP and passing through point PTP, is sent to the calculation unit 6 in order to solve the optimum control problem OCP for the minimization of the cost function CF. As a result of the problem OCP, the mission M is obtained (in particular, a trajectory along which, instant by instant, the driving parameters to be respected—driving, acceleration, speed, steering, etc.—are known), which optimizes the cost function CF. Finally, based on the value DRV rating the driving ability of the driver DR, the corrective actions AC and the information IN to be transmitted to the driver DR, by means of the interface device 9, are processed.

Advantageously, though not necessarily, the method comprises the further step of actively enhancing the performance PE of the driver DR by correcting driving commands given by the driver DR, so as to prevent an actual performance PE of the road vehicle 1 from straying from the mission M beyond a predefined value. In order to do so, the vehicle 1 operates the actuator devices described above and allows the driver DR to make a good performance PE in a semi-automatic manner, actively helping the driver DR (approximately) accomplish the mission M. In other words, in case the performance PE strays too much from the mission M, the actuator devices intervene by correcting the driving commands given by the driver DR and by allowing the difference between the performance and the mission to go back below the predefined value.

According to a further non-limiting embodiment, the method further comprises the step of driving, by means of the control unit 11 and following a selection of the driver DR through the dedicated operating device, the vehicle 1 in an autonomous manner so as to show to the driver DR the mission M optimizing the cost function CF.

Advantageously, though not necessarily, the method comprises the following step of having the driver DR replicate the mission M previously shown by the road vehicle 1 during the vehicle 1 autonomous driving step.

Advantageously, though not necessarily, in case the driver DR strays from the mission M in a dangerous manner, the method comprises the further step of helping the driver DR and restoring a safety condition by correcting the driving commands given by the driver, in particular through the use of the actuator devices described above.

The non-limiting embodiment of FIG. 5 shows a schematic diagram in which the vehicle 1, like in the embodiment of FIG. 4, collects the dynamic data DD and the environmental data ED (as well as the driver rating value DRV) and uses them as input for solving the optimum control problem OCP, comprising the use of the dynamic model DM of the vehicle 1. Unlike the embodiment of FIG. 4, in this case the mission M computed by the calculation unit 6 is also affected by possible external faults or errors ER and by the action of the control unit 11, which determines the operation and the control of the actuator devices so as to comprise two cases. A first case in which (considering the arrow going from the control unit 11 to the calculation unit 6) the control unit 11 completely controls the vehicle 1 in an autonomous manner (which happens when the operating device 12 is operated or a situation that could be dangerous for the vehicle 1 or the driver DR occurs) and returns to the calculation of the optimum control problem OCP as soon as the vehicle approaches a passing through point PTP and calculates another one. A second case in which the control unit 11 operates the actuator devices for the sole purpose of helping the driver DR, by means of a low-level control, for example a PID, (approximately) accomplish the mission M, hence without taking over control of the vehicle instead of the driver DR.

Advantageously, though not necessarily, the vehicle 1 described above is configured to carry out the method disclosed so far.

Even though the invention described above relates to a specific embodiment example, it should not be considered as limited to said embodiment example, for its scope of protection also includes all those variants, changes or simplifications covered by the appended claims, such as, for instance, a different cost function optimization method, a different type of vehicle (for example, a two-wheel vehicle or a front-drive vehicle), different dynamic or environmental data, etc.

The invention offers many advantages.

First of all, it enhances the performances of a driver driving a road vehicle by suggesting the driver corrective actions that are calculated not only based on the current dynamic of the vehicle, but also based on the future path to be covered by the vehicle. In this way, the driver can receive suggestions on when to accelerate, decelerate, shift gear and on which trajectory to follow based on what the vehicle perceives around itself.

Furthermore, the invention actively helps the driver reach performances of a good level through the aid of the actuator devices, which only partially control the driving commands, so as not to excessively stray from the mission to be accomplished.

A further advantage of the invention lies in the possibility of training the driver by empirically showing him/her how to cover certain difficult segments of the path thanks to the autonomous control of the vehicle, which occurs when the operating device is activated.

Furthermore, the invention increases the safety of the vehicle, since, in case of danger situations, such as the closeness of an obstacle at a high speed, the control system of the vehicle brakes, steers and shifts to a lower gear so as to restore the safety of the driver and of the vehicle.

In addition, thanks to the possibility of transmitting suggestions by means of an augmented reality interface, the learning of the driver and the improvement of his/her driving ability are facilitated.

Finally, the invention classifies the driving ability of the driver and optimizes the instructions to be given to him/her in order to improve his/her performances.

The invention claimed is:
1. A method for the performance-enhancing driver assistance of a road vehicle (1) driven by a driver (DR); the method comprises the steps of:
   detecting a plurality of dynamic data (DD) of the vehicle (1) by means of a control system (5);
   suggesting to the driver (DR), by means of an interface device (9) and depending on the plurality of dynamic data (DD), one or more corrective actions (CA) to be carried out in order to accomplish a mission (M) optimizing a cost function (CF); and
   estimating the driving ability of the driver (DR) in order to obtain a driver rating value (DRV), based on which the corrective actions (CA) to be suggested are to be changed; wherein the quantity of corrective actions (CA) suggested to the driver (DR) follows a variable profile (PR) which changes depending on the driver rating value (DRV), wherein the driver rating value (DRV) is a multifactorial value consisting of estimations of longitudinal performances and lateral performances of the vehicle obtained from a plurality of driving evaluations.
2. The method according to claim 1 and comprising the further steps of:
   defining, only once during a design and development phase, a dynamic model (DM) of the road vehicle (1);

determining, in use, the actual position and orientation of the road vehicle (1) in the space by means of a localization device (3);

detecting, in use, a plurality of environmental data (ED) concerning the environment in which the road vehicle (1) operates by means of ADAS devices (4);

determining, in use, in an automatic manner completely independent of the driver (DR) and cyclically, a passing through point (PTP) of the road vehicle (1) arranged in front of the road vehicle (1) and at a given distance from the road vehicle (1) along a path followed by the road vehicle (1); and solving, through the use of the dynamic model (DM) of the road vehicle (1), an optimum control problem (OCP) aimed at optimizing a cost function (CF), taking into account, as boundary conditions, the plurality of environmental data (ED), the actual position (AP) and the passing through point (PTP), so as to compute the mission (M) optimizing the cost function (CF) from the actual position (AP) of the vehicle (1) to the passing through point (PTP) of the vehicle (1).

3. The method according to claim 2, wherein the cost function (CF) to be optimized is the time needed to go from a actual position (AP) to the passing through point (PTP).

4. The method according to claim 1, wherein:
the mission (M) comprises an optimal trajectory, in particular determined depending on the actual position (AP) of the vehicle (1), on the passing through point (PTP), on the environmental data (ED) and on the dynamic data (DD) of the vehicle (1); and when covering the optimal trajectory, the road vehicle (1) moves from a actual position (A) to a passing through point (PTP) optimizing the cost function (CF).

5. The method according to claim 1, wherein the driving ability of the driver (DR) is estimated by comparing ideal behaviours with the longitudinal and lateral performances from the plurality of driving evaluations (14); in particular, the use of a brake pedal (BP) and/or the use of a transmission (M) and/or the use of a steering wheel (SW) and/or the use of a gas pedal (GP) and/or the wear of one or more tyres and/or the use of oversteering and understeering and/or the trajectory followed.

6. The method according to claim 5, wherein each driving evaluation has a respective weight and the driver rating value (DRV) is calculated by means of a weighted mean of the driving evaluations (14).

7. The method according to claim 6, wherein part of the driving evaluations (14) have a static weight and part of the driving evaluations (14) have a dynamic weight depending on the difficulty of the mission (M) optimizing the cost function (CF).

8. The method according to claim 7, wherein the variable profile (PR) comprises a central peak (PK).

9. The method according to claim 8, wherein the variable profile (PR) is a bell-shaped profile.

10. The method according to claim 7, wherein the variable profile (PR) is symmetrical.

11. The method according to claim 1, wherein the plurality of environmental data (ED) comprises the presence of obstacles and/or the position of cars to be surpassed.

12. A road vehicle (1) comprising:
a localization device (3) configured to identify the actual position and orientation of the road vehicle (1);

one or more ADAS devices (4) configured to detect a plurality of environmental data (ED) concerning the environment in which the road vehicle (1) operates;

a control system (5) configured to detect a plurality of dynamic data (DD) of the vehicle (1);

a calculation unit (6) configured to solve, through the use of the dynamic model (DM) of the road vehicle (1), an optimum control problem (OCP) aimed at optimizing a cost function (CF), taking into account, as boundary conditions, the plurality of environmental data (ED), the actual position (AP) and a passing through point (PTP) of the vehicle (1), and to process the mission (M) optimizing the cost function (CF) from the actual position (AP) of the vehicle (1) to the passing through point (PTP) of the vehicle (1);

one or more corrective actions to be carried out in order to accomplish the mission (M); and an estimation unit (13) configured to estimate the driving ability of a driver (DR) and to obtain a driver rating value (DRV), based on which the corrective actions (CA) to be suggested are to be changed; wherein the quantity of corrective actions (CA) suggested to the driver (DR) follows a variable profile (PR) which changes depending on the driver rating value (DRV), and wherein the driver rating value (DRV) is a multifactorial value consisting of estimations of longitudinal performances and lateral performances of the vehicle obtained from a plurality of driving evaluations.

* * * * *